United States Patent
Hodsdon et al.

(10) Patent No.: US 10,906,214 B2
(45) Date of Patent: Feb. 2, 2021

(54) MODULAR MOLDING ASSEMBLY

(71) Applicant: Velcro BVBA, Deinze (BE)

(72) Inventors: Jerry G. Hodsdon, Manchester, NH (US); Christopher M. Gallant, Nottingham, NH (US)

(73) Assignee: Velcro BVBA, Deinze (BE)

( * ) Notice: Subject to any disclaimer, the term of this patent is extended or adjusted under 35 U.S.C. 154(b) by 0 days.

(21) Appl. No.: 16/708,502

(22) Filed: Dec. 10, 2019

(65) Prior Publication Data

US 2020/0108530 A1 Apr. 9, 2020

Related U.S. Application Data

(62) Division of application No. 15/797,198, filed on Oct. 30, 2017, now Pat. No. 10,556,369.

(51) Int. Cl.
*B29C 43/22* (2006.01)
*B29C 43/34* (2006.01)
(Continued)

(52) U.S. Cl.
CPC ............ *B29C 43/46* (2013.01); *B29C 43/222* (2013.01); *B29C 43/245* (2013.01); *B29C 43/28* (2013.01);
(Continued)

(58) Field of Classification Search
CPC ....... B29C 43/222; B29C 43/28; B29C 43/34; B29C 43/46; B29C 43/50;
(Continued)

(56) References Cited

U.S. PATENT DOCUMENTS

| 3,230,134 A | 1/1966 | Studer |
| 3,266,113 A | 8/1966 | Flanagan |
| (Continued) | | |

FOREIGN PATENT DOCUMENTS

| DE | 1937746 | 2/1970 |
| DE | 2109652 | 9/1972 |
| (Continued) | | |

OTHER PUBLICATIONS

PCT International Search Report in International Application No. PCT/EP2018/077278, dated Dec. 20, 2018, 17 pages.
(Continued)

*Primary Examiner* — James P Mackey
(74) *Attorney, Agent, or Firm* — Fish & Richardson P.C.

(57) ABSTRACT

A molding apparatus defining a processing direction includes multiple molding modules spaced apart in a lateral direction perpendicular to the processing direction and a common reaction surface. Each molding module includes a frame and a mold roll that defines molding cavities. Each mold roll defines a respective pressure zone in cooperation with the reaction surface and each mold roll is movable with respect to the reaction surface by controlled operation of the frame. Molten resin is introduced into the pressure zones and forced into the molding cavities to form arrays of fastener elements extending from base layers of resin formed on the surfaces of the mold rolls. The fastener elements are withdrawn from the cavities while stripping the base layers from the peripheral surfaces.

20 Claims, 9 Drawing Sheets

(51) Int. Cl.
  *B29C 43/46* (2006.01)
  *B29C 43/28* (2006.01)
  *B29C 43/50* (2006.01)
  *B29C 48/00* (2019.01)
  *B29C 48/35* (2019.01)
  *B29C 43/24* (2006.01)
  *B29C 48/30* (2019.01)
  *B29L 31/00* (2006.01)

(52) U.S. Cl.
  CPC .......... *B29C 43/50* (2013.01); *B29C 48/0011* (2019.02); *B29C 48/30* (2019.02); *B29C 48/35* (2019.02); *B29C 43/34* (2013.01); *B29C 2043/3433* (2013.01); *B29C 2043/465* (2013.01); *B29C 2043/467* (2013.01); *B29L 2031/729* (2013.01)

(58) Field of Classification Search
  CPC ........ B29C 2043/465; B29C 2043/467; B29C 2043/3277; B29C 2043/3433; B29C 48/0011
  See application file for complete search history.

(56) References Cited

U.S. PATENT DOCUMENTS

| | | | |
|---|---|---|---|
| 3,267,191 A | 8/1966 | Williams et al. | |
| 3,312,583 A | 4/1967 | Rochlis | |
| 3,445,915 A | 5/1969 | Cuckson et al. | |
| 3,462,332 A | 8/1969 | Goto | |
| 3,557,413 A | 1/1971 | Engle | |
| 3,594,865 A | 7/1971 | Erb | |
| 3,600,766 A | 8/1971 | Alberts | |
| 3,608,035 A | 9/1971 | Frohlich | |
| 3,726,752 A | 4/1973 | Provost | |
| 3,758,657 A | 9/1973 | Menzin et al. | |
| 3,843,760 A | 10/1974 | Teed | |
| 3,956,056 A | 5/1976 | Boguslawski et al. | |
| 3,983,278 A | 9/1976 | Wardle | |
| 4,001,366 A | 1/1977 | Brumlik | |
| 4,056,593 A | 11/1977 | De Navas Albareda | |
| 4,097,634 A | 6/1978 | Bergh | |
| 4,189,809 A | 2/1980 | Sotos | |
| 4,329,196 A | 5/1982 | Rawlinson | |
| 4,451,421 A | 5/1984 | Jones et al. | |
| 4,615,084 A | 10/1986 | Erb | |
| 4,726,975 A | 2/1988 | Hatch | |
| 4,775,310 A | 10/1988 | Fischer | |
| 4,784,890 A | 11/1988 | Black | |
| 4,794,028 A | 12/1988 | Fischer | |
| 4,872,243 A | 10/1989 | Fischer | |
| 4,894,060 A | 1/1990 | Nestegard | |
| 4,931,344 A | 6/1990 | Ogawa et al. | |
| 4,933,224 A | 6/1990 | Hatch | |
| 4,999,067 A | 3/1991 | Erb et al. | |
| 5,260,015 A | 11/1993 | Kennedy et al. | |
| 5,393,475 A | 2/1995 | Murasaki et al. | |
| 5,441,687 A | 8/1995 | Murasaki et al. | |
| 5,518,795 A | 5/1996 | Kennedy et al. | |
| 5,669,120 A | 9/1997 | Wessels et al. | |
| 5,744,080 A | 4/1998 | Kennedy et al. | |
| 5,945,131 A | 8/1999 | Harvey et al. | |
| 6,045,349 A | 4/2000 | Ishida et al. | |
| 6,066,281 A | 5/2000 | Provost | |
| 6,099,289 A | 8/2000 | Jens et al. | |
| 6,248,419 B1 | 6/2001 | Kennedy et al. | |
| 6,737,147 B2 | 5/2004 | Kennedy et al. | |
| 6,803,010 B2 * | 10/2004 | Leach | A44B 18/0076 264/297.3 |
| 7,048,818 B2 | 5/2006 | Krantz et al. | |
| 7,108,814 B2 * | 9/2006 | Herrero | A44B 18/0049 24/442 |
| 7,727,440 B2 * | 6/2010 | Armela | B29C 43/222 264/177.17 |
| 9,649,792 B2 | 5/2017 | Gallant | |
| 10,436,236 B2 | 10/2019 | Hodsdon et al. | |
| 10,556,369 B2 | 2/2020 | Hodsdon et al. | |
| 2003/0034583 A1 | 2/2003 | Provost | |
| 2003/0213549 A1 | 11/2003 | McAmish et al. | |
| 2004/0201124 A2 | 10/2004 | Harvey et al. | |
| 2006/0260484 A1 | 11/2006 | Mizunuma et al. | |
| 2007/0035060 A1 | 2/2007 | Harvey et al. | |
| 2010/0300171 A1 | 12/2010 | Hanson et al. | |
| 2013/0280474 A1 | 10/2013 | Medina et al. | |
| 2016/0193757 A1 | 7/2016 | Sugimoto et al. | |
| 2017/0066176 A1 | 3/2017 | Häusl | |
| 2019/0126519 A1 | 5/2019 | Hodsdon | |
| 2019/0126522 A1 | 5/2019 | Hodsdon | |

FOREIGN PATENT DOCUMENTS

| | | |
|---|---|---|
| EP | 0580073 | 1/1994 |
| EP | 1286605 | 3/2003 |
| EP | 3015243 | 5/2016 |
| FR | 1117251 | 5/1956 |
| FR | 2082591 | 12/1971 |
| FR | 2348801 | 11/1977 |
| FR | 2364004 | 4/1978 |
| GB | 2017522 | 10/1979 |
| JP | 52-18228 | 6/2013 |

OTHER PUBLICATIONS

PCT International Search Report in International Application No. PCT/EP2018/078156, dated Jan. 24, 2019, 13 pages.
PCT International Search Report in International Application No. PCT/EP2018/078153, dated Feb. 1, 2019, 12 pages.

* cited by examiner

MODULAR MOLDING ASSEMBLY

TECHNICAL FIELD

This invention relates generally to equipment and methods for making longitudinally continuous products with limited arrays of molded projections, such as fastener elements.

BACKGROUND

Roll-forming processes are employed to mold resin into various products, including to mold continuous flexible strips of resin with arrays of projections extending from one side of a base layer. In some cases, the strips are formed permanently laminated to a flexible substrate, such as by running the substrate through a molding nip with molten resin, and pressing the resin into cavities of a molding roller. The resin can be introduced to the roller in separate streams, so as to mold spaced strips on the substrate.

Improvements in methods of making products of different desired configurations, and in the equipment for performing such methods, are desired.

SUMMARY

One aspect of the invention features a molding apparatus that defines a processing direction. The molding apparatus includes a reaction surface and multiple molding modules. The molding modules are spaced apart in a lateral direction perpendicular to the processing direction, for simultaneous molding in respective regions associated with the modules. Each molding module includes a frame and a rotatable roller coupled to the frame. The rotatable roller defines in cooperation with the reaction surface a respective pressure zone. At least one of the reaction surface and rotatable roller defines an array of molding cavities. The rotatable roller of each molding module is independently movable with respect to proximity to the reaction surface by controlled operation of the frame of the molding module.

In some examples, the molding apparatus further includes at least one resin source configured to introduce molten resin into the pressure zone to be forced into the molding cavities by pressure in the pressure zone. In some examples, each molding module includes a respective resin source. In some cases, the resin source is configured to supply a continuous flow of resin to the pressure zone, for forming a continuous layer of resin. In some cases, the resin source is configured to supply molten resin in discontinuous quantities, for forming an interrupted layer of resin.

In some embodiments, the molding modules are arranged to mold resin on different portions of one or more substrates moving between the roller and the reaction surface. In some arrangements, the molding modules are arranged to mold resin on a common surface of a substrate moving between the rollers and the reaction surface. In some cases, each molding module is configured to apply pressure to a first region of the substrate in the pressure zone, while a second region of the substrate is located between two pressure zones.

In some arrangements, the molding cavities are shaped to form discrete stems extending from a layer of resin formed between the reaction surface and the rotatable roller. In some examples, the molding cavities are shaped to form touch fastener elements with heads overhanging the layer of resin. In some examples, the molding apparatus includes at least one knock-down roller arranged to level the fastener elements uniformly with respect to the layer of resin. In some cases, the molding apparatus includes multiple knock-down rollers, with each knock-down roller associated with a corresponding molding module.

In some examples, the reaction surface includes a surface of a rotatable pressure roll. In some examples, the pressure zone between the rotatable roller and the pressure roll includes a nip into which resin is drawn under shear force developed by rotation of the pressure roll. In some cases, the rotatable roller is a passive roller that is configured to be driven at least in part by movement of the pressure roll. In some cases, the molding apparatus further includes a drive roll spaced from the pressure roll. The drive roll is configured to engage an outer surface of the rotatable roller through resin disposed on the outer surface.

In some embodiments, the molding apparatus further includes a substrate feeder arranged to feed a flexible substrate into the pressure zones between the rotatable rollers and the reaction surface, for lamination of the molten resin onto the flexible substrate in at least one of the pressure zones during molding of resin in the arrays of cavities. In some cases, the molding apparatus further includes at least one deflector shoe arranged between rotatable rollers, limiting separation of the substrate from the reaction surface. In some arrangements, the molding apparatus includes multiple deflector shoes, with each shoe secured to the frame of a respective molding module.

In some examples, each rotatable roller is also independently movable with respect to the reaction surface in a lateral direction parallel to a rotation axis of the roller. In some cases, each rotatable roller is laterally movable by laterally moving its molding module.

In some arrangements, the rotatable roller defines the array of mold cavities in a peripheral surface of the rotatable roller.

In some cases, the molding module further includes, for each molding module, a linear actuator operable to move the rotatable roller with respect to the reaction surface.

Another aspect of the present disclosure features a method of molding a fastener product along a processing direction. The method includes positioning multiple molding modules with respect to a common reaction surface, so that each module has a respective mold roll forming a respective pressure zone in cooperation with the reaction surface. The pressure zones are spaced apart along the common reaction surface according to the positioning of the modules. Each of the mold rolls has a peripheral surface and defines an array of cavities that extend into the mold roll from the peripheral surface. The method further includes introducing molten resin separately into each pressure zone. The resin is introduced such that during rotation of the mold rolls with respect to the reaction surface, the introduced resin is forced into the cavities in the pressure zones to form arrays of projections. The arrays of projections extend from base layers of resin formed on the peripheral surfaces of the mold rolls. The method further includes withdrawing the projections from the cavities while stripping the base layers from the peripheral surfaces.

In some examples, the projections include molded fastener elements.

In some arrangements, the method further includes, after withdrawing the projections, plastically deforming the projections to form fastener elements.

In some cases, positioning each molding module includes moving the module in a direction perpendicular to the processing direction. In some examples, positioning each molding module further includes, after moving the module in the direction perpendicular to the processing direction, moving the mold roll of the module toward the reaction surface. In some cases, moving the mold roll toward the reaction surface includes first moving the mold roll at a relatively fast rate and then moving the mold roll at a slower rate.

In some arrangements, the method further includes positioning a substrate between the molding modules and the common reaction surface, such that as the resin is forced into the cavities in the pressure zones, the resin is laminated to the substrate to form the base layers as layers spaced apart by exposed regions of the substrate. In some examples, the method further includes repositioning the molding modules during a pause in the introduction of molten resin, to alter a spacing of the base layers on the substrate. In some cases, the method further includes limiting separation of the substrate from the reaction surface by using at least one deflector shoe coupled to the molding modules.

In some examples, the reaction surface includes a driven pressure roll arranged so that, during introduction of the molten resin, driven rotation of the pressure roll causes rotation of the mold roll. In some cases, the method further includes a drive roll spaced from the pressure roll so that, during introduction of the molten resin, driven rotation of the drive roll causes rotation of the mold roll in cooperation with the pressure roll.

Various implementations of the invention can be configured so as to enable particularly efficient molding of resin projections, either on separate base layers or on layers connected by a common flexible substrate. The modular arrangement allows the molding equipment to be quickly reconfigured without having to remove or disassemble heavy, delicate molding rolls, and sometimes even with a substrate threaded through the equipment. The arrangement of separate molding rolls against a common reaction surface, such as a pressure roll, can reduce some of the undesired effects of bending long mold rolls under extreme nip pressures, and can allow for the in-process adjustment of molding parameters (e.g., base layer thickness, nip pressure) across a single product. Such adjustment can even be used to reduce the effects of pressure roll bending. Other advantages will also be evident from the following description of examples.

BRIEF DESCRIPTION OF THE DRAWINGS

Common reference numbers in different figures indicate similar or identical elements.

DETAILED DESCRIPTION

Figure 1A:
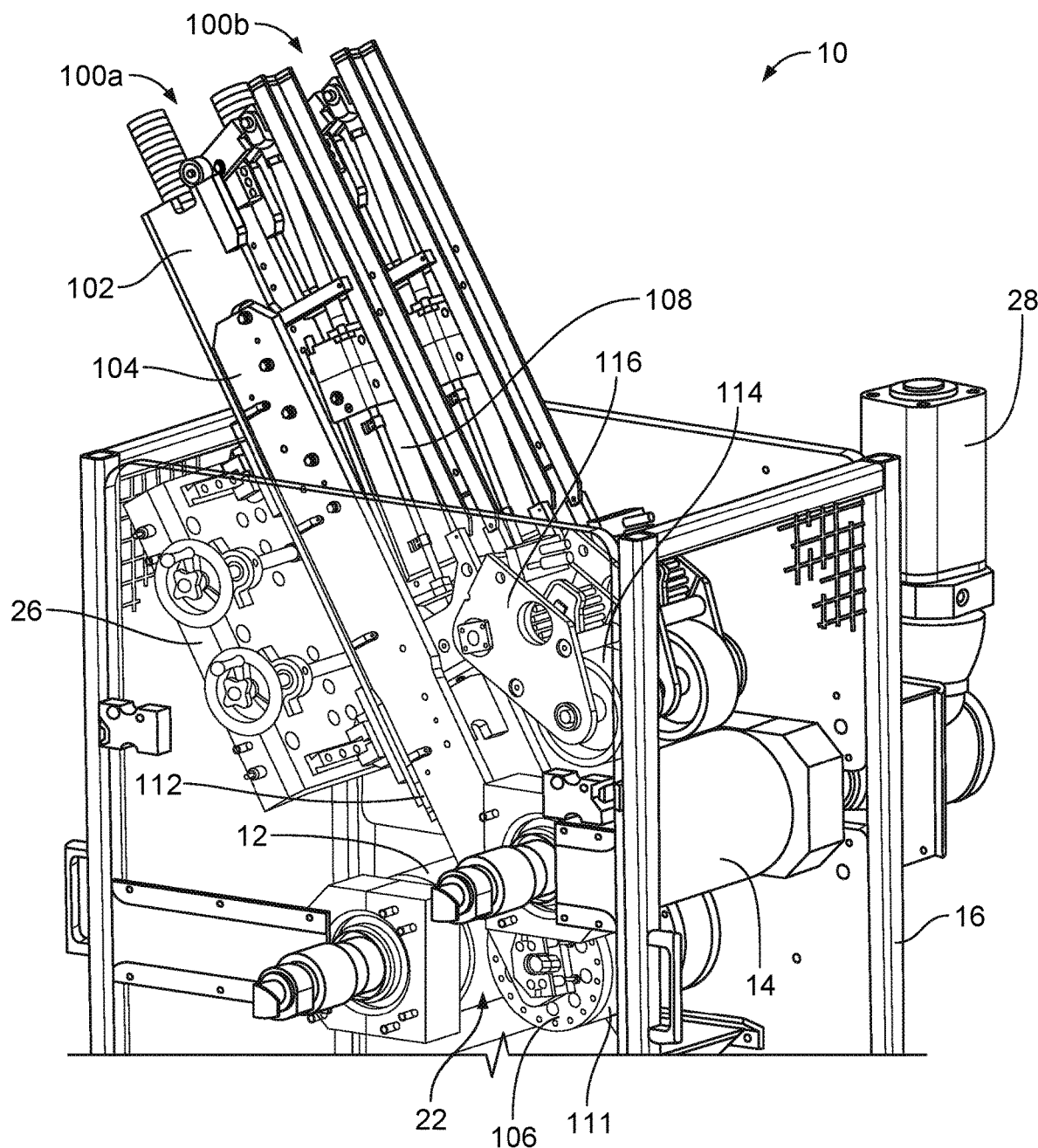
FIG. 1A is a perspective view of a molding apparatus having two molding modules.

Referring to FIG. 1A, a molding apparatus 10 for producing fastener products features two molding modules 100a and 100b inside a processing enclosure 16. Each molding module includes a base 102, a frame 104, a rotatable roller 106, a resin extrusion head 112, and a linear actuator 108 (e.g., a drive cylinder). The molding modules 100a and 100b are positioned to mold resin in collaboration with a pair of spaced-apart, fixed-axis processing rollers 12 and 14. The processing rollers 12 and 14 are mounted on chamber 16 and are driven about their respective axes by a motor 28 such as a direct drive motor, a belt drive motor, or a combination of the two. Each roller can be driven by a respective motor. The processing rollers form a gap between them, through which gap molding modules 100a and 100b extend. During operation, structural base 102 is fixed in position with respect to the processing rollers axes, while frame 104 can move along the length of base 102. Each base 102 is slidably mounted on a bench 26 that is fixed to chamber 16, allowing its respective molding module to be moved in a lateral direction parallel to the rotation axes of the processing rollers. While only two modules are shown in this example, molding apparatus 10 may include more than two molding modules, such as three, four, or even five or more modules.

Figure 1B:
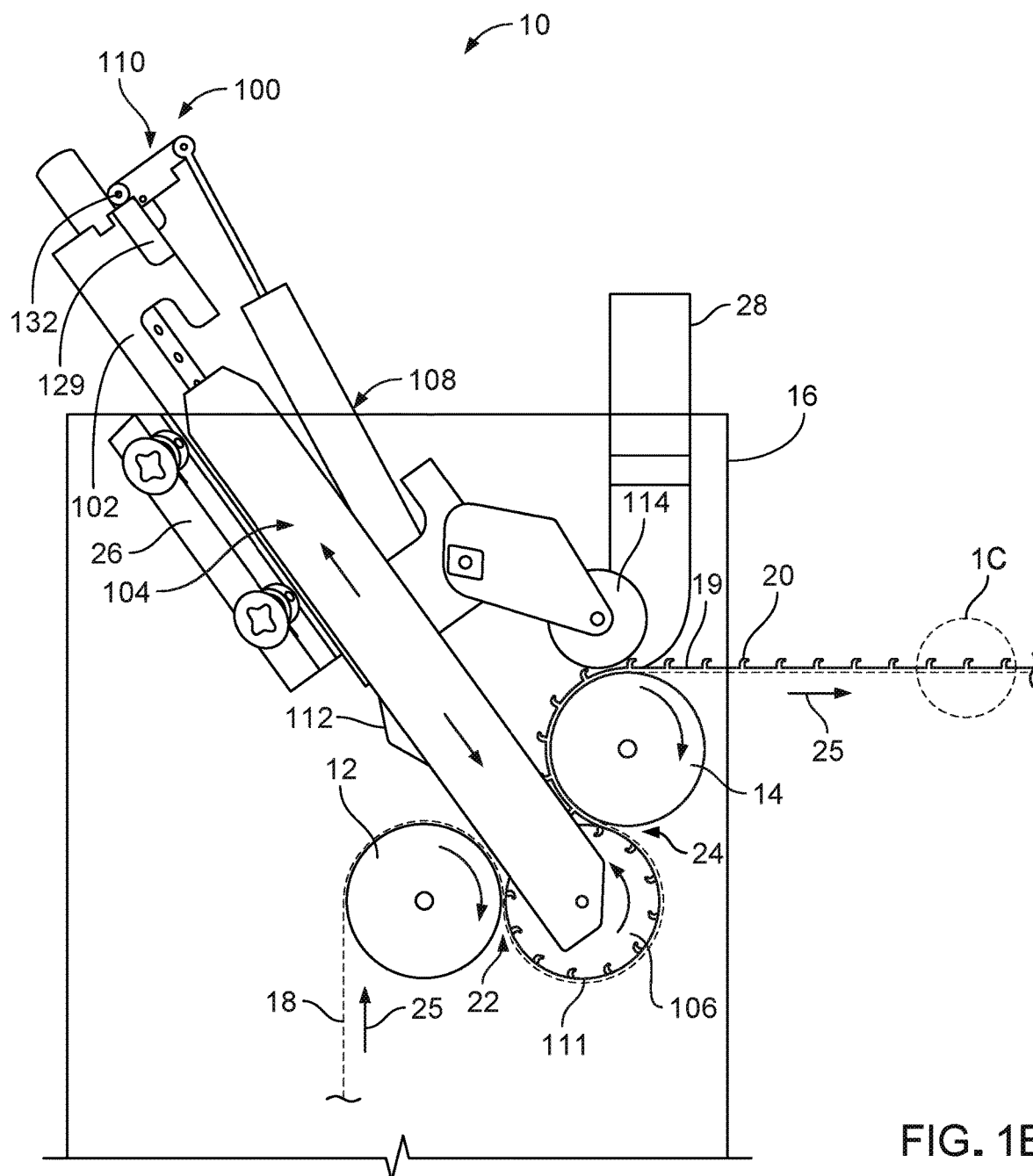
FIG. 1B is a side elevation view of the molding apparatus of FIG. 1A and a method for laminating resin onto a pleated product.
Figure 1C:
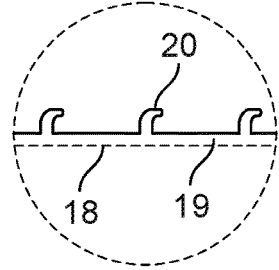
FIG. 1C is an enlarged view of area 1C in FIG. 1B.

Referring also to FIGS. 1B and 1C, molding apparatus 10 defines a processing direction 25 and performs a continuous extrusion/roll-forming method for forming fastener elements 20 on an integral, resin sheet-form base 19. Extrusion head 112 is attached to a bottom end of base 102 and supplies a sheet of molten resin (not shown) to a pressure zone or molding nip 22 defined between rotatable roller 106 and processing roller 12, which functions both as a reaction surface and a drive roll.

Rotatable roller 106 is attached to a distal end of frame 104, and by operation of the frame the roller 106 is movable toward and away from both rollers 12 and 14. Rotatable roller 106 (sometimes referred to herein as mold roll), defines an array of miniature, molding cavities extending inward from its periphery 111 for molding fastener elements 20. The pressure in nip 22 forces resin to enter and fill the exposed molding cavities, while excess resin forms base 19 on the peripheral surface of the mold roll and interconnects the filled cavities that form fastener elements 20. Mold roll 106 is continuously cooled, e.g., by controlled flow of coolant through its interior, heat is extracted from the product as the product passes through first nip 22 and travels to a second nip 24 between mold roll 106 and processing roller 14, which functions as a counter-rotating drive roll. Alternatively, processing rollers 12 and 14, or an external source, can provide cooling to the molten resin, as the only cooling source or in collaboration with mold roll 106. The heat removal solidifies fastener elements 20 (e.g., hooks), subsequently allowing elements 20 to be peeled from their fixed cavities by drive roll 14, also referred to as a take-off roll. Hooks 20 are then leveled uniformly by a knock-down roller 114 attached to structural base 102. Alternatively, mold roll 106 can be configured to form arrays of projections (e.g., straight stems) extending from base 19 that are peeled from the cavities of mold roll 106 and plastically deformed by a knock-down roller to form the fastener elements.

Figure 2:
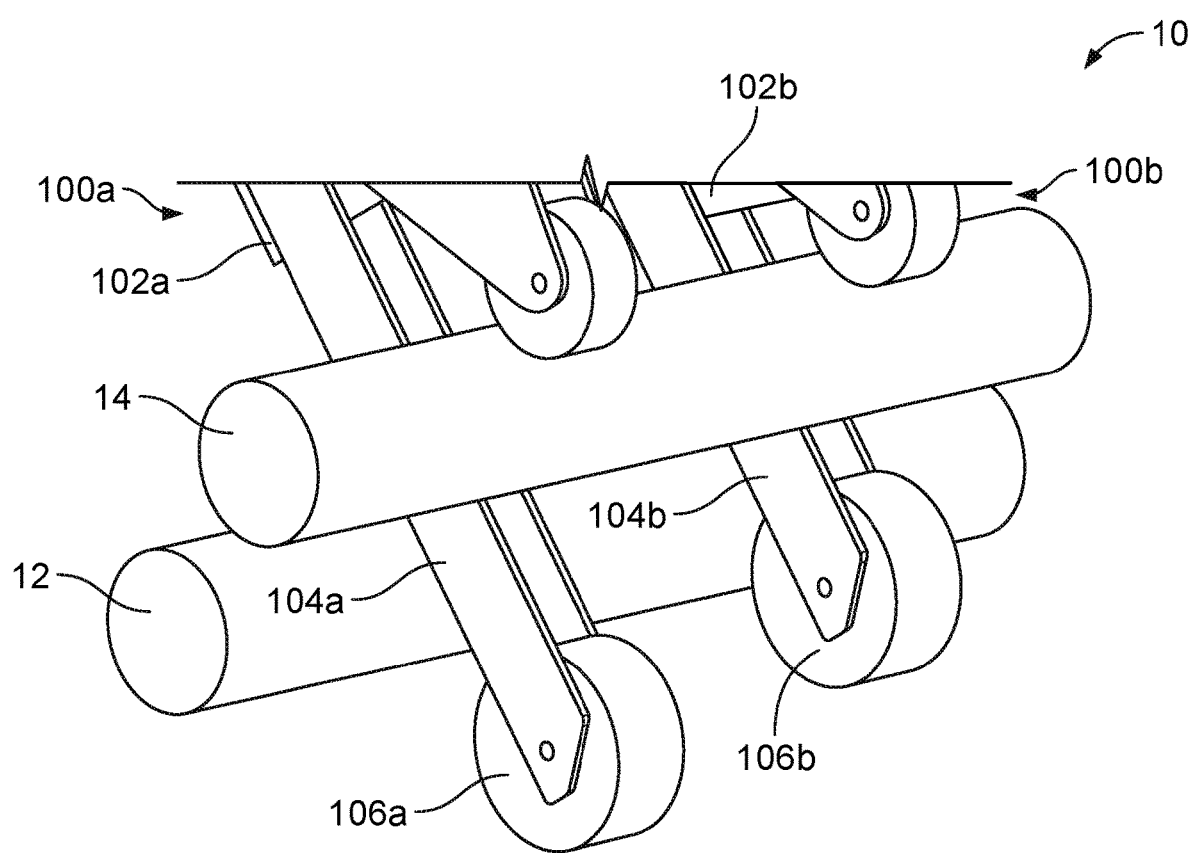
FIG. 2 is a perspective view of a section of the molding apparatus of FIG. 1A with the molding modules in a disengaged position.

Referring also to FIG. 2, in a non-operating position the molding modules 100a and 100b are disengaged from processing rollers 12 and 14. To disengage molding modules 100a and 100b, each frame 104a and 104b independently moves along its respective base 102a and 102b to position the mold rolls 106a and 106b away from the processing rollers 12 and 14.

As shown in FIG. 1B, a substrate 18, shown in dashed lines, may be trained about the rollers in order to mold resin on a surface of substrate 18. Substrate 18 is preferably a non-woven fabric. To start up the machine, frame 104 moves mold roll 106 away from processing rollers 12 and 14, and substrate 18 is then positioned about the processing rollers and mold roll 106, extending in the processing direction 25. When frame 104 moves mold roll 106 in position against pressure roll 12 and drive roll 14, with resin between the rollers in the nips, the apparatus is configured to mold fastener elements while laminating resin base 19 to the surface of substrate 18. Substrate 18 is laminated to the resin in pressure nip 22 and is carried about mold roll 106 with the solidifying resin. Substrate 18 is then stripped from mold roll 106 at nip 24 with the solidified resin, and exits molding apparatus 10 as the fastener product shown in FIG. 1C.

Pressure roll 12 and drive roll 14 rotate in the same direction and, when in engagement with mold roll 106, both rollers drive mold roll 106 to rotate. Mold roll 106 is a passive roller, only rotating by movement of pressure roll 12 and drive roll 14. Drive roll 14 engages outer surface 111 of mold roll 106 through resin base 19 on outer surface 111, and pressure roll 12 engages mold roll 106 through the resin dropped into nip 22. When molding on a substrate, the rollers also engage through the thickness of the substrate in the nips. As shown in FIG. 2, when the frame is extended, the mold roll is spaced from the processing rollers and readily accessible to be changed or serviced. This position also allows other components of apparatus 10 such as the processing rollers 12 and 14 or the frames to be serviced or removed for maintenance, or for a substrate to be threaded between the rolls during setup.

As shown in FIGS. 1A and 2, pressure roll 12 and drive roll 14 have generally the same length, both rollers being longer than mold roll 106 and knock-down roll 114. Each molding module 100a and 100b is relatively narrow, and, each can be moved independently in a lateral direction parallel to its mold roll axis. This movement is preferably done with the mold roll retracted, but can also be done during molding. This flexibility allows each mold roll 106a and 106b to be placed in different locations along the length of pressure roll 12, so that each module can apply resin at any selected position across the width of one or more substrate sheets.

Figure 3A:
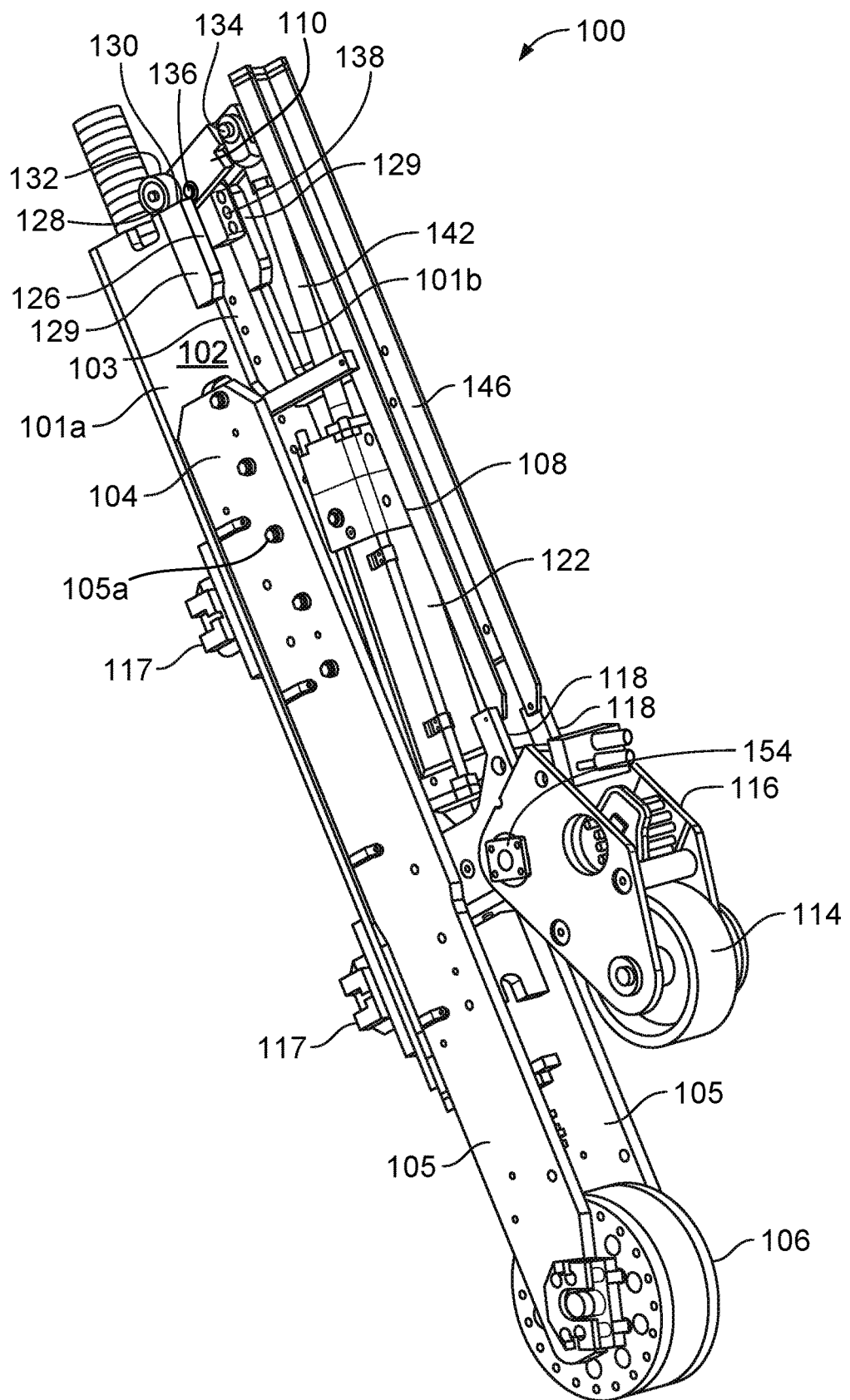
FIG. 3A is a perspective front view of a molding module assembly.
Figure 3B:
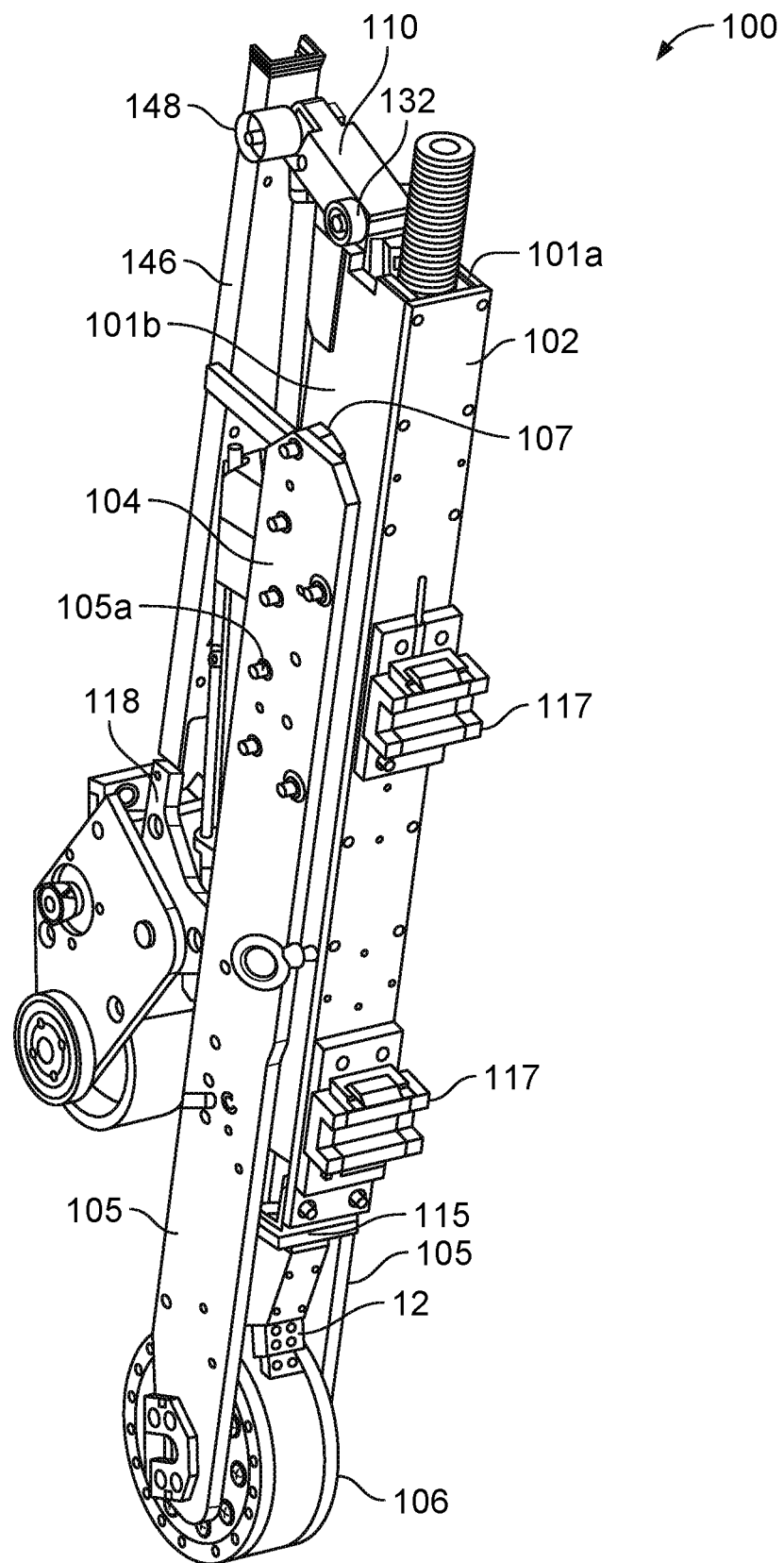
FIG. 3B is a perspective back view of the molding module assembly of FIG. 3A.

Referring now to FIGS. 3A and 3B, molding module 100 has a structural base 102 with a U-shaped channel with two opposite walls 101a and 101b, a bottom plate 115 connecting both sides at a distal, bottom end, and a pair of linear bearings 117 attached to the back of the U-shaped channel. Each wall 101a and 101b defines an open slot 107 in the middle, and a corner piece 129 attached at a distal, upper end. At one end of open slot 107, each wall 101a and 101b forms an L-shaped structure 118 connected to a linking arm 116 that carries the knock-down roll 114. Base 102 has a rail connection (not shown) between both walls 101a and 101b that receives frame 104. Linear bearings 117 are configured to be slidably retained within rails of bench 26 (as in FIG. 1A), and together form a linear bearing guide that allows the molding module 100 to move laterally.

Knock-down roll 114 is mounted on linking arm 116 that is connected to base 102. Linking arm 116 biases knock-down roll 114 downward against the take-off roll by virtue of a spring loaded shaft connection 154 with internal torsion springs and/or linear springs, with a positive stop that can be adjusted to set a desired gap. The pressure applied by knock-down roll 114 to the drive roll pushes down against the fastener elements to level them, making the fastener product more uniform. Knock-down roll 114 need only be of sufficient width to engage the fastener elements molded by mold roll 106.

Corner piece 129 is made of a rigid material such as carbon steel and features two exposed surfaces: a side surface 126 and back surface 128, defining between them a corner 130. Side surface 126 and back surface 128 are both straight, with back surface 128 being generally perpendicular to side surface 126. Alternatively, back surface 128 can be curved or otherwise profiled, and/or extend in a different direction, such as forming an obtuse or an acute angle with side surface 126. Corner piece 129 is permanently secured to the rest of base 102.

Frame 104 has three parts: an internal rail 103 and two external mounting arms 105. Internal rail 103 is a long plate that has a top end with a pin block 138 extending beyond the edges of mounting arms 105 when assembled. On a back surface, internal rail 103 defines linear bearing rail connections (not shown) to slidably connect to base 102. A wider part of internal rail 103 extends beyond slots 107 when assembled. Each mounting arm 105 of the frame has recesses 105a for receiving screws to connect to internal rail 103. One mounting arm 105 connects to each side of internal rail 103 such that internal rail 103 is disposed inside base 102 and mounting arms 105 are disposed outside the base. This connection constrains frame 104 against relative motion other than in a direction parallel to side surface 126 of base 102, along the length of the slot.

In addition, molding module 100 includes a lever arm 110 that has a first pivot hole 136 for connecting to pin block 138 and a second pivot hole 134 for connecting to drive cylinder 108. Lever arm 110 also has one end connected to a pair of cam roller bearings 132, such as needle bearings. Roller bearings 132 are coaxially connected to lever arm 110, with one roller bearing 132 on each side of lever arm 110. Pivot hole 136 is located between second pivot hole 134 and roller bearings 132 along the length of the lever arm. The shape of lever arm 110 can be altered to adapt for different connections with the drive cylinder, rail connection block and/or roller bearings 132. Alternatively, instead of roller bearings 132, lever arm 110 can include cam rollers or a different object with a bearing surface, including a fixed bearing (cam) surface. Lever arm 110 also includes an additional roller bearing 148 coupled to the second pivot 134, to contact a lever support 146 of base 102.

In addition, molding module 100 features drive cylinder 108 that is pivotally coupled to base 102. Drive cylinder 108 has a cylinder rod 142 and a cylinder barrel 122. Barrel 122 is pivotally connected to base 102 at a pivot coupling between L-shaped structures 118, and rod 142 is pinned to lever arm 110 at second pivot hole 134. Alternatively, drive cylinder 108 can be mounted in the opposite direction, with rod 142 connected to the base and barrel 122 connected to lever arm 110, disposed above the lever arm, on an opposite side of the lever arm as the mold roll. Drive cylinder 108 may be any type of controllable linear actuator, such as a pneumatic or hydraulic cylinder actuated under fluid pressure, a ball screw actuator, or a linear motor.

To move frame 104 along base 102, drive cylinder 108 is actuated to move lever arm 110, which travels along corner piece 129. Starting when drive cylinder is in a retracted position, lever arm 110 is positioned longitudinally parallel to side surface 126. When drive cylinder 108 extends cylinder rod 142, roller bearings 132 roll along corner piece 129, moving from side surface 126, around the corner 130, to back surface 128 of corner piece 129. During this motion, lever arm 110 moves frame 104 with respect to base 102 over a linear stroke of drive cylinder 108 that moves second pivot 134 along a continuous motion path. More specifically, as lever arm 110 moves over the linear stroke of cylinder 108, frame moves mold roll 106 toward pressure roll 12 and drive roll 14 (FIG. 1B), applying pressure to both rollers 12 and 14. This happens in a two-step process, starting with the frame 104 extended and the mold roll disengaged (as in FIG. 2). First, motion along a first path segment of the lever arm brings mold roll 106 into close proximity with pressure roll 12 and drive roll 14, under no appreciable resistance. Second, as drive cylinder 108 continues to extend, moving the lever arm along a second path segment and continuing to raise the rail member, mold roll 106 is moved into closer proximity with pressure roll 12, but at a slower rate. Once in position for molding, mold roll 12 can apply sufficiently leveraged force to resin in the molding nip to generate the necessary nip pressure to fill the mold cavities and to generate enough torque from rotation of the driven rolls to cause rotation of the mold roll. During molding, nip pressure can be controlled by cylinder motion, increasing nip pressure by extending cylinder rod 142 and decreasing nip pressure by retracting cylinder rod 142. Further details of the cylinder operation and related linkage can be found in U.S. application Ser. No. 15/797,164, entitled "Linear Actuator Leverage" and filed on the same day herewith, the entire contents of which are incorporated by reference herein.

Lever support 146 helps lever arm 110 move along a continuous motion path, as lever arm 110 moves from the first path segment to the second path segment by allowing cam roller 148 of lever arm 110 to bear against support 146 when roller bearings 132 move along corner 130. Support 146 is fixed at a distance from side surface 126, 'pushing' lever arm 110 toward back surface 128 when lever arm 110 is pivoting to move past corner 130 to the second path segment.

Figure 4:
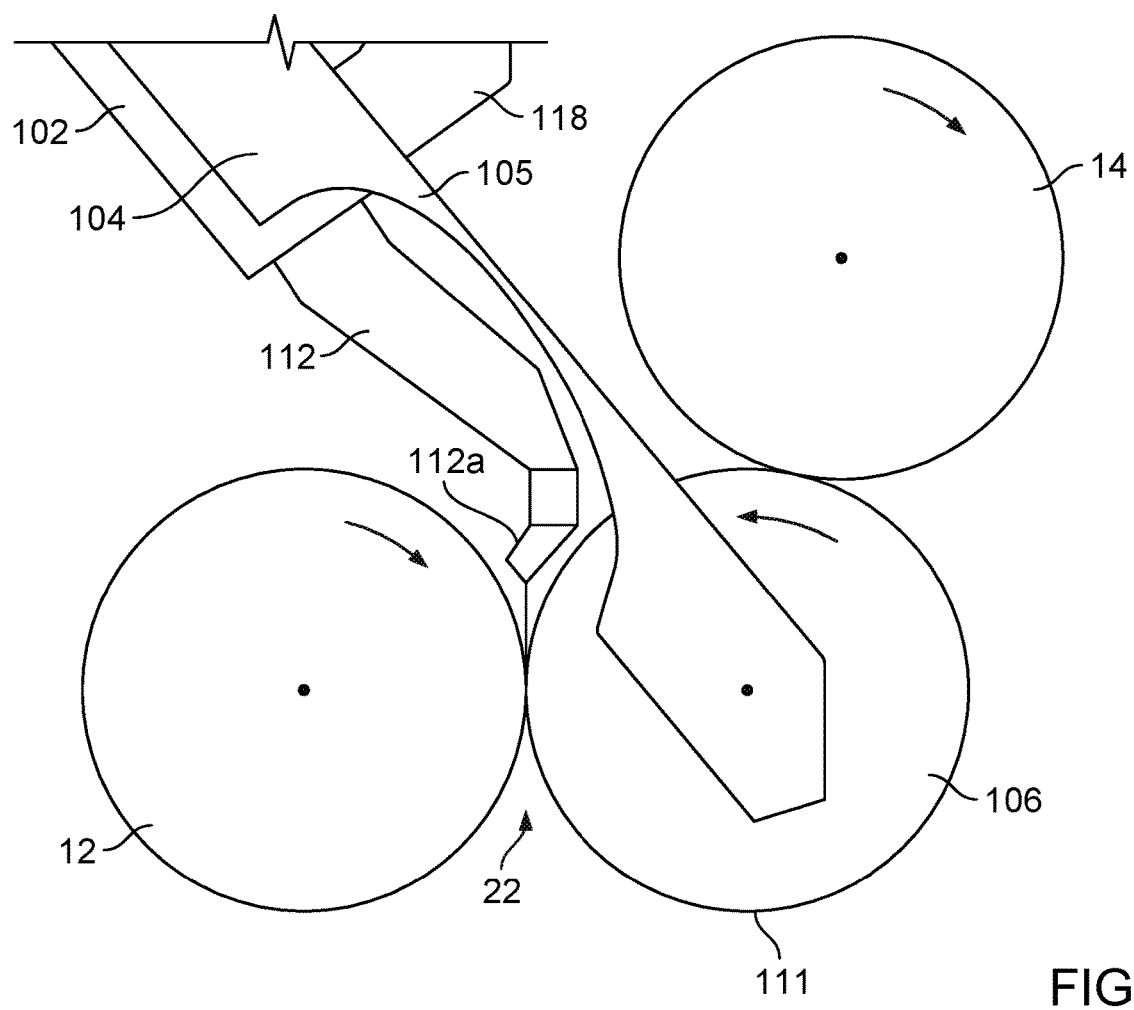
FIG. 4 is a schematic side view of the molding apparatus, showing an extrusion head attached to the molding module.

Referring now to FIG. 4, extrusion head 112 is connected to a bottom end of base 102, between mounting arms 105 of frame 104. Extrusion head 112 includes a nozzle 112a for introducing molten resin to molding nip 22. The position of head 112 is adjustable such as to position nozzle 112a directly above nip 22, such that the extruded molten resin falls vertically into nip 22 under the force of gravity. Alternatively, head 112 can be positioned to drop the molten resin onto a surface of pressure roll 12 or the surface of mold roll 106, to be carried into nip 22 by rotation of the rollers. Head 112 can be configured to introduce molten resin continuously or, when using a substrate, in a series of discrete amounts, to form islands spaced apart longitudinally over the substrate to form an interrupted strip of fastener elements.

Figure 6:
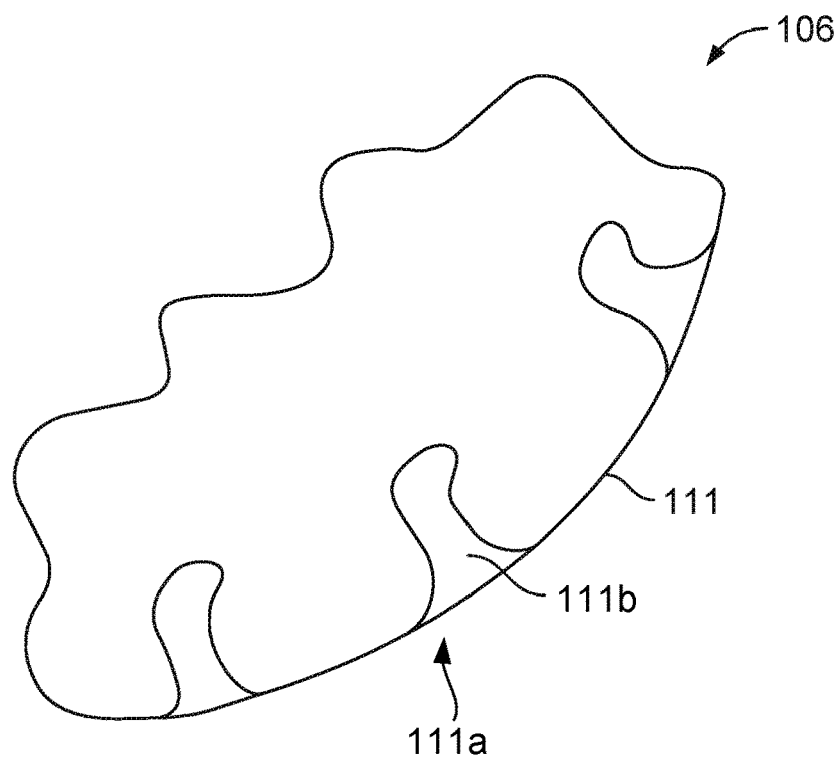
FIG. 6 is an enlarged, partial cross-section view through the rotatable roller, showing molding cavities.
Figure 7:
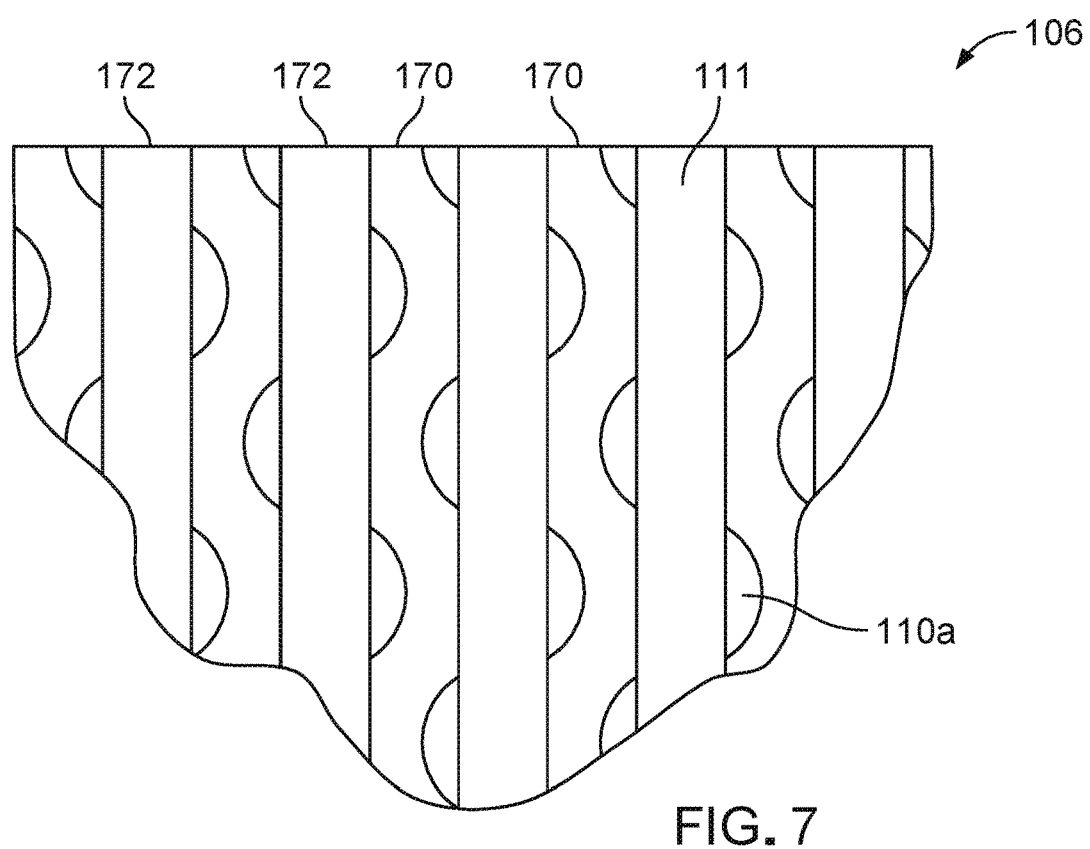
FIG. 7 is a partial front view of the rotatable roller showing rings that form the molding cavities.

Referring to FIG. 6, mold roll 106 includes fixed molding cavities 111a for molding resin, and its periphery is made out of rings, as shown in FIG. 7. Fixed molding cavities 111a extend inward from periphery 111 of mold roll 106. Cavities 111a have a shape specifically designed to facilitate both complete filling of the cavities as well as relatively easy removal of the solidified fastener elements 20. Cavities 111a are configured so that removing or peeling away fastener elements 20 can be done without opening cavities 111a. Each cavity 111a includes a throat 111b having an inwardly tapered configuration, which opens toward periphery 111, such as to allow the removal of fastener element 20 from cavities 111a without breaking or substantially deforming fastener elements 20.

As shown in FIG. 7, mold roll 106 includes concentric etched or engraved rings 170, and substantially flat spacer rings 172, which together define molding cavities 111a within which fastener elements are formed. In this example, each of rings 170 and 172 is provided with an outside diameter of about 250 mm, and a thickness of about 0.15 to 1.0 mm. The cavities may only partially extend through a given ring, or may extend fully through a ring and bounded by adjacent surfaces of spacer rings.

Figure 5:
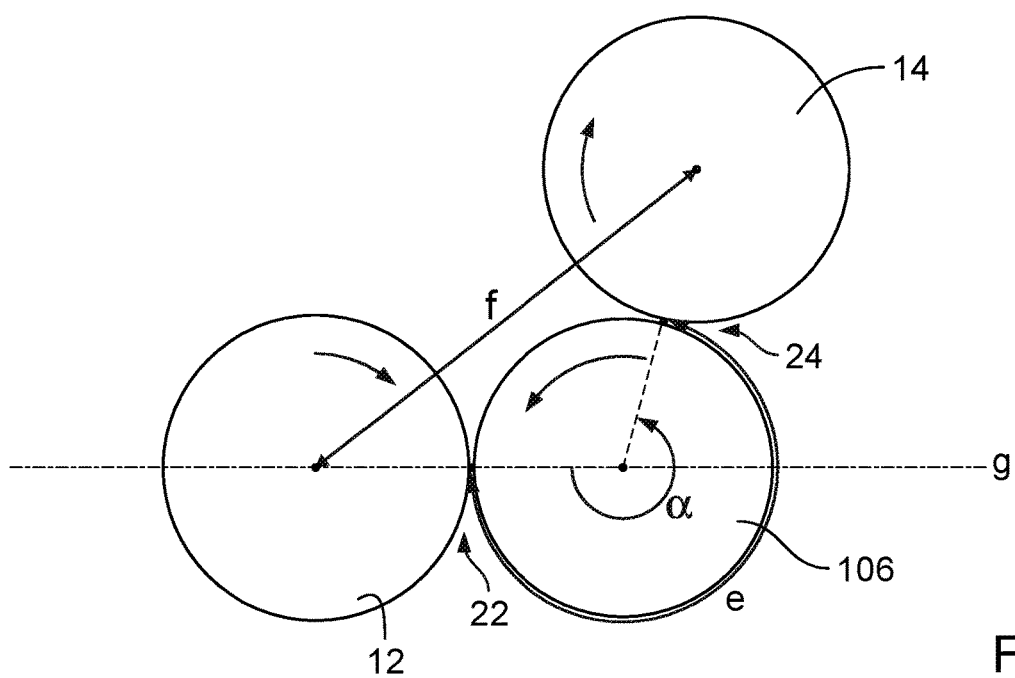
FIG. 5 is a schematic illustration of an apparatus and method for positioning a rotatable roller with respect to a pair of processing rollers for molding resin.

FIG. 5 shows mold roll 106 in position to mold fastener elements, cooperatively engaged with the surfaces of both pressure roll 12 and drive roll 14. Mold roll 106 and pressure roll 12 each have a respective rotation axis, with both axes being parallel and lying in a common horizontal plane 'g', such that nip 22 is symmetric about a vertical plane for receiving molten resin dropped from the extrusion nozzle. Alternatively, plane g can be tilted to suit a different configuration of apparatus 10. Each of rolls 12 and 14 has a diameter of, for example, 250 mm, with a distance 'f' between the rotation axes of pressure roll 12 and drive roll 14 of, for example, 438 mm. Wrap angle α is defined from the centers of nips 22 and 24 (where lines connecting the roll centers cross the nips) and represents the included angle of the portion of the mold roll surface over which the resin is cooled and solidified. As mold roll 106 rotates counterclockwise during the molding process, the resin is sufficiently cooled from molding nip 22 to second nip 24 to be stripped out from cavities 111a by drive roll 14. Angle α is preferably between 190° and 300°, such as 240°. As the mold roll is urged toward the pressure and drive rolls during molding, the minimum gap between the pressure and drive rolls will be necessarily less than the diameter of the drive roll, and angle α will be always greater than 180°. With wrap angle α having a value of 240°, for example, and mold roll 106 having a radius of 250 mm, for example, circumferential cooling distance e is 531 mm. This implementation allows the product on mold roll 106 to be carried for a longer time, in comparison to an aligned roll stack where angle α is 180°. The greater angle α, the more heat may be removed from the product, enabling higher run speeds.

Figure 8:
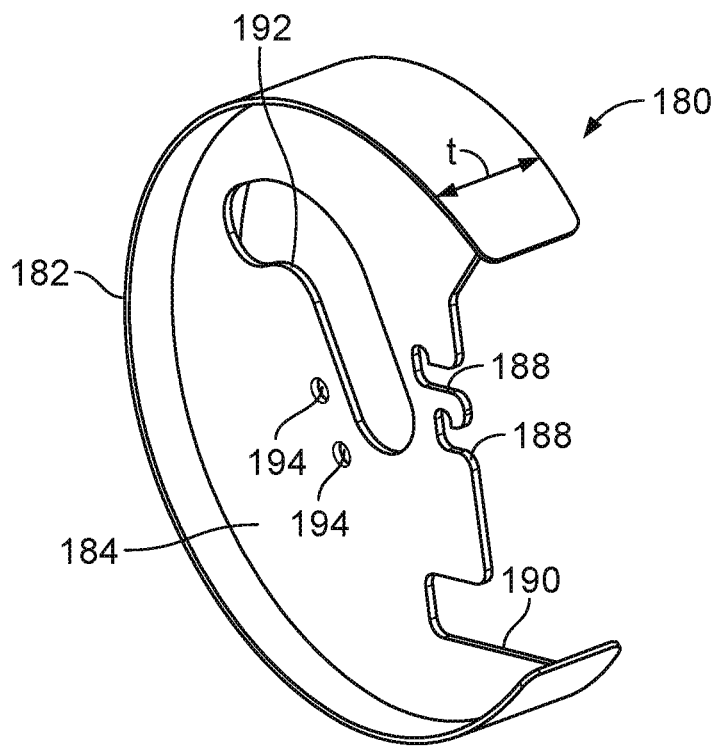
FIG. 8 is a perspective view of a deflector shoe.
Figure 9:
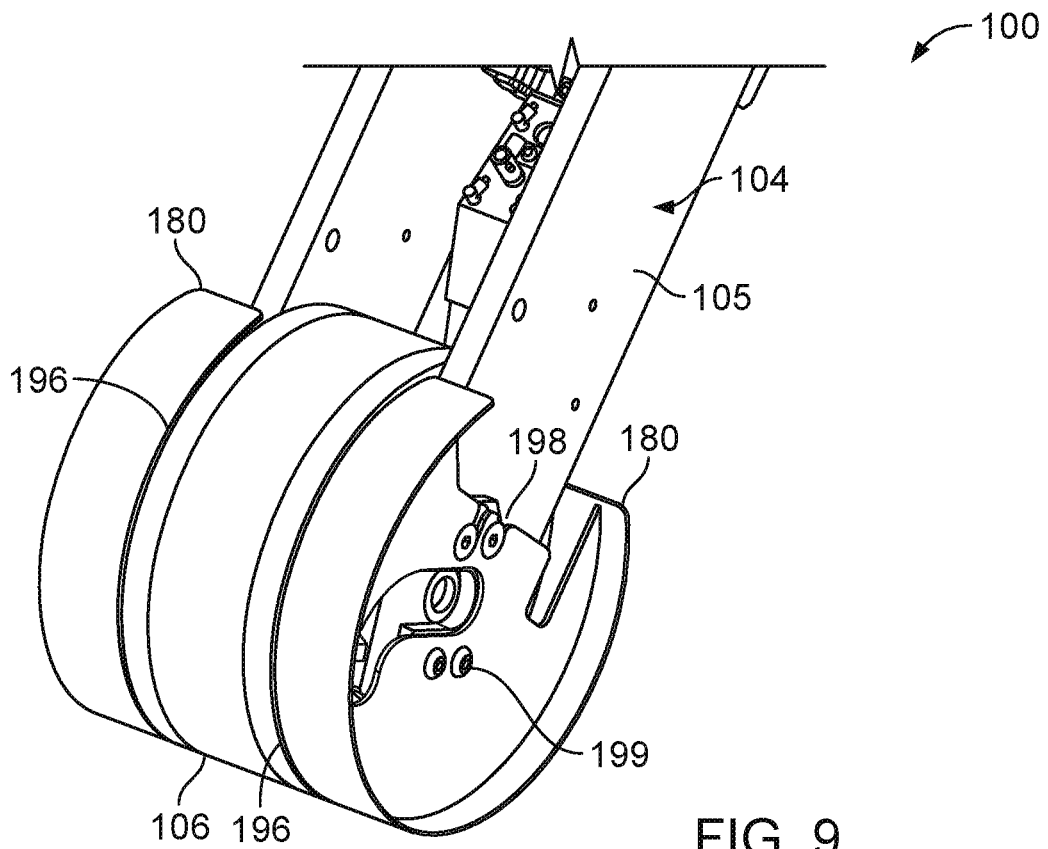
FIG. 9 shows a section of a molding module with a pair of deflector shoes mounted on a frame of the molding module, with each shoe secured to one side of the rotatable roller.

Referring now to FIGS. 8 and 9, a deflector shoe 180 has a circular plate 184 with a cylindrical opened ring 182 coupled to the periphery of plate 184. Ring 182 has an uniformly continuous outer surface with a thickness 't' of approximately 25 to 75 millimeters (optimally, sized to fill most of the spacing between adjacent mold rolls) and a diameter similar to the diameter of mold roll 106, and extends about ¾ of the way around the shoe. In some cases, the shoe diameter can be smaller than the diameter of mold roll 106. As shown in FIG. 9, cylindrical opened ring 182 is configured to receive an end of mounting arm 105, allowing plate 184 to couple to frame 104 adjacent mold roll 106. Shoe 180 forms a narrow gap 196 with mold roll 106. As shown in FIG. 8, circular plate 184 has some slots that receive fasteners for connecting to frame 104, and other slots arranged to permit access to a side of mold roll 106 when shoe 180 is mounted on frame 104. For example, an open square slot 190 and an L-shaped slot 192 allow access to a side of mold roll 106 for maintenance, disassembly, or feeding mold roll 106 with a cooling fluid. Small L-shaped slots 188 and holes 194 receive fasteners for connecting shoe 180 to frame 104, as shown in FIG. 9. In this example, fasteners 199 are conventional screws and fasteners 198 are spring loaded fasteners that, when connected, allow shoe 180 to be temporarily separated from the frame after conventional screws 199 have been taken out or loosen. This is useful when spring fasteners 198 are not readily accessible, allowing the assembly to be disconnected and/or easily accessed for maintenance. Details of spring fasteners 198 can be found in U.S. application Ser. No. 15/728,630, entitled "Threaded Fastening" and filed on Oct. 10, 2017, the entire contents of which are incorporated by reference herein.

Figure 10:
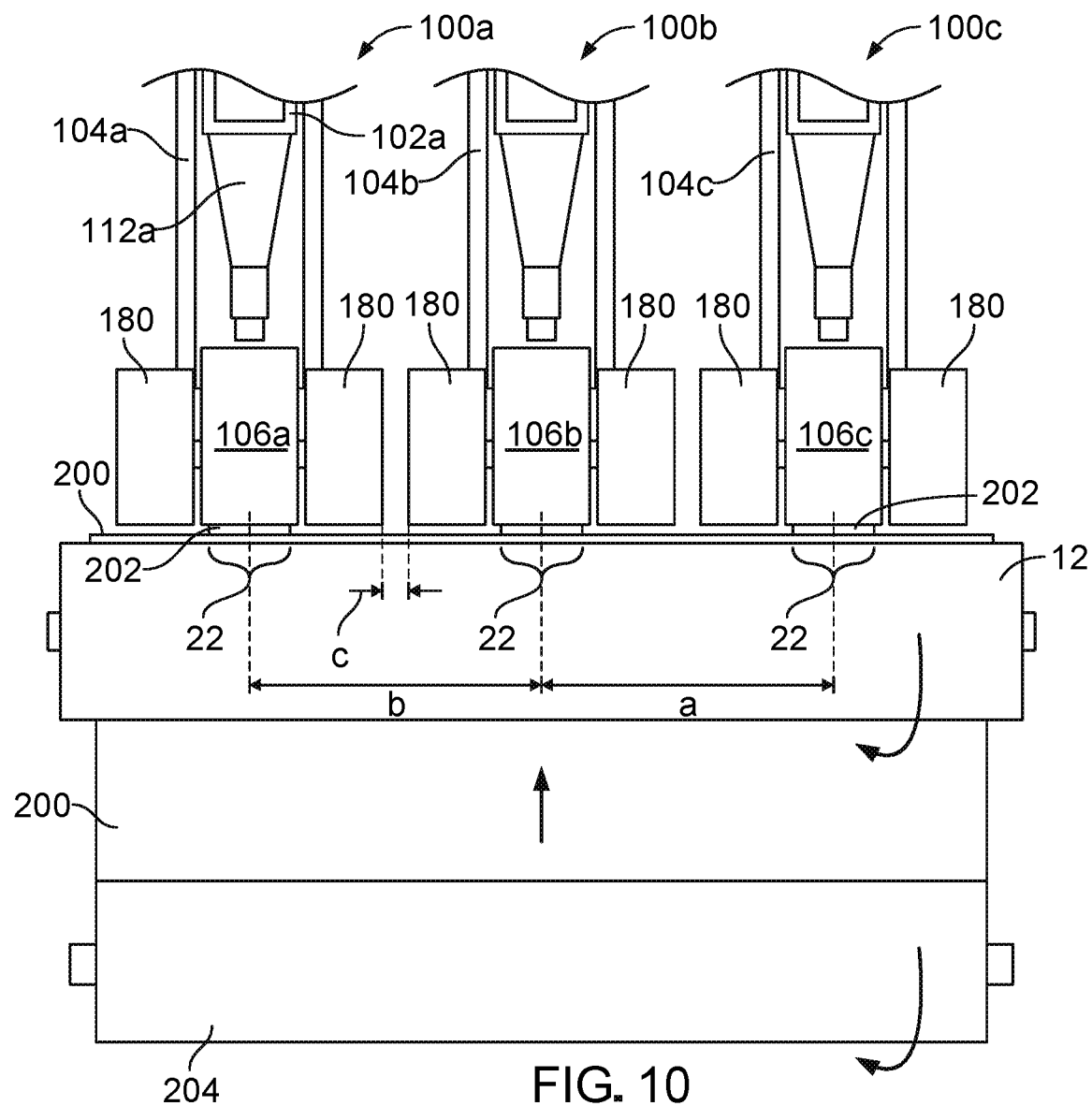
FIG. 10 illustrates the use of the removable deflector shoes.

Referring to FIG. 10, three molding modules 100a, 100b, and 100c with shoes 180 are spaced apart laterally and aligned along a direction perpendicular to the processing direction for molding resin onto a substrate. For clarity, the respective knock-down rollers of each module, and the drive roll, are not shown. A substrate feeder 204, such as a roll of substrate, feeds a flexible substrate 200 into the pressure zones 22, for lamination of molten resin 202 onto substrate 200. The lamination takes place in the pressure zones 22 during molding of resin 202 in the arrays of mold cavities. Each molding module molds a strip of resin 202, molding together three strips of resin onto substrate 200. The removable deflector shoes 180 are secured to respective frames 104a, 104b, and 104c, and are placed on each side of mold rolls 106a, 106b, and 106c. Shoes 180 are arranged to limit separation of substrate 200 from pressure roll 12 as the substrate passes through the nips, keeping substrate 200 from creasing between the mold rolls. The adjacent shoes 180 that are attached to separate molding modules are separated by a module separation gap 'c' of between 1.0 and 5.0 mm, with the spacing 'a' and 'b' between longitudinal centers of adjacent mold rolls, for example, 160 mm respectively. Distances 'a' and 'b' can be the same, or the width of each module and/or the separation gaps can be varied to position the mold rolls as desired for different applications. In addition, shoes 180 can be selectively removed, such as to allow creasing or puckering of substrate 200 in selected areas between pressure zones. In cases where two lanes of fastener resin are required very close to each other on a substrate, a corresponding single module can be provided with a roll of multiple cavity regions, with a die that provides corresponding, spaced streams of resin to the cavity regions.

A selected number of examples of the invention are described above in some detail. It should be understood that other examples will be apparent from the above description and may fall within the following claims.

What is claimed is:

1. A method of molding a fastener product along a processing direction, the method comprising:
positioning multiple molding modules with respect to a common reaction surface, each module having a respective mold roll forming a respective pressure zone in cooperation with the reaction surface, with the pressure zones spaced apart along the common reaction surface according to the positioning of the modules, the mold rolls each having a peripheral surface and defining an array of cavities extending into the mold roll from the peripheral surface;
introducing molten resin separately into each pressure zone, such that during rotation of the mold rolls with respect to the reaction surface, the introduced resin is forced into the cavities in the pressure zones to form arrays of projections extending from base layers of resin formed on the peripheral surfaces of the mold rolls; and then
withdrawing the projections from the cavities while stripping the base layers from the peripheral surfaces.

2. The method of claim 1, wherein the projections comprise molded fastener elements.

3. The method of claim 1, further comprising, after withdrawing the projections, plastically deforming the projections to form fastener elements.

4. The method of claim 1, wherein positioning each molding module comprises moving the module in a direction perpendicular to the processing direction.

5. The method of claim 4, wherein positioning each molding module further comprises, after moving the module in the direction perpendicular to the processing direction, moving the mold roll of the module toward the reaction surface.

6. The method of claim 4, wherein moving the mold roll toward the reaction surface comprises first moving the mold roll at a first rate and then moving the mold roll at a second rate slower than the first rate.

7. The method of claim 1, further comprising positioning a substrate between the molding modules and the common reaction surface, such that as the resin is forced into the cavities in the pressure zones the resin is laminated to the substrate to form the base layers as layers spaced apart by exposed regions of the substrate.

8. The method of claim 7, further comprising repositioning the molding modules during a pause in the introduction of molten resin, to alter a spacing of the base layers on the substrate.

9. The method of claim 7, further comprising limiting separation of the substrate from the reaction surface by using at least one deflector shoe coupled to the molding modules.

10. The method of claim 1, wherein the reaction surface comprises a driven pressure roll, and wherein, during introduction of the molten resin, driven rotation of the pressure roll causes rotation of the mold rolls.

11. The method of claim 10, further comprising a drive roll spaced from the pressure roll, and wherein, during introduction of the molten resin, driven rotation of the drive roll causes rotation of at least one of the mold rolls in cooperation with the pressure roll.

12. The method of claim 1, wherein introducing molten resin comprises introducing the molten resin in discontinuous quantities, thereby forming an interrupted layer of resin.

13. The method of claim 1, wherein the molding modules are arranged to mold resin on different portions of one or more substrates moving between the mold rolls and the reaction surface.

14. The method of claim 1, wherein the molding modules are arranged to mold resin on a common surface of a substrate moving between the mold rolls and the reaction surface.

15. The method of claim 1, further comprising, after withdrawing the projections, knocking down heads of the withdrawn projections to level the projections with respect to the layer of resin.

16. The method of claim 1, wherein the reaction surface comprises a surface of a rotatable pressure roll, the method comprising drawing the molten resin into nips between the mold rolls and the pressure roll under shear force developed by rotation of the pressure roll.

17. The method of claim 1, further comprising engaging an outer surface of at least one of the mold rolls, through resin disposed on the outer surface, with a drive roll spaced from the pressure roll.

18. The method of claim 1, further comprising feeding a flexible substrate into the pressure zones between the mold rollers and the reaction surface, for lamination of the molten resin onto the flexible substrate in at least one of the pressure zones during molding of resin in the arrays of cavities.

19. The method of claim 18, further comprising limiting separation of the substrate from the reaction surface with at least one deflector shoe arranged between adjacent mold rolls.

20. The method of claim 1, further comprising independently adjusting relative positions of the mold rolls with respect to the reaction surface in a lateral direction parallel to rotation axes of the mold rolls.

* * * * *